Patented Sept. 16, 1947

2,427,605

UNITED STATES PATENT OFFICE 2,427,605

PREPARATION OF ALKYLHALOGENO-
SILANES

Dallas T. Hurd, Schenectady, N. Y., assignor to General Electric Company, a corporation of New York No Drawing. Application March 15, 1945,
Serial No. 582,997

10 Claims. (Cl. 260—607)

The present invention relates to the preparation of alkylhalogenosilanes. It is more particularly concerned with the preparation of mixtures of alkylhalogenosilanes containing relatively large quantities of the trialkylhalogenosilane.

In the copending application of Eugene G. Rochow, Serial No. 412,459, filed September 26, 1941, now Patent No. 2,380,995, issued August 7, 1945, and assigned to the same assignee as the present invention, is disclosed and broadly claimed the method of preparing organosilicon halides, more particularly hydrocarbon-substituted silicon halides, which comprises effecting reaction between silicon and a hydrocarbon halide. The copending application of Eugene G. Rochow and Winton I. Patnode, Serial No. 412,460, filed September 25, 1941, now Patent No. 2,380,996, issued August 7, 1945, and assigned to the same assignee as the present invention is directed specifically to a method of preparing hydrocarbon-substituted silicon halides, e. g., methyl silicon chlorides (methylchlorosilanes) wherein is utilized a solid, porous silicon-metallic catalyst contact mass of the kind disclosed and claimed in the copending application of Winton I. Patnode, Serial No. 412,-461, also filed September 26, 1941, now Patent No. 2,380,997, issued August 7, 1945, and assigned to the same assignee as the present invention.

When an alkyl halide, for example, methyl chloride, is passed over heated silicon or silicon-copper mixtures or alloys as described in the above-mentioned Rochow and Rochow and Patnode applications, there generally is obtained a complex mixture of products containing substantial quantities of methyltrichlorosilane and dimethyldichlorosilane and a relatively small quantity of the trimethylchlorosilane along with unreacted methyl chloride. As a result the relative quantity of the trimethylchlorosilane has fallen short of the demand for this compound which is used, for example, along with the dimethyl derivative, in the preparation of polysiloxane fluids and lubricants such as those described and claimed in the copending application of Winton I. Patnode, Serial No. 463,814, filed October 29, 1942, and assigned to the same assignee as the present invention.

A primary object of the present invention is to provide a process for producing mixed alkylhalogenosilanes containing substantial quantities of the trialkyl derivatives. A specific object of this invention is to provide a method of increasing the yield of trialkylhalogenosilanes, such as trimethylchlorosilane, trimethylbromosilane, triethylchlorosilane, etc., obtained from the reaction between a lower alkyl halide such as methyl chloride, methyl bromide, ethyl chloride, etc., and silicon with or without the presence of a metal catalyst for the silicon-alkyl halide reaction.

These and further objects of the invention, which will become apparent from the following description of the invention, are attained by incorporating substantial quantities of aluminum or zinc into the silicon or silicon-metallic catalyst contact masses employed in the preparation of the alkylhalogenosilanes. Best results appear to be obtained with silicon-copper contact masses containing at least 1 percent, preferably from about 2 to 25 percent, by weight of aluminum or zinc based on the weight of the silicon.

The aluminum or zinc may be incorporated into or mixed with the silicon or silicon-metal catalyst mass in any suitable manner. For example, the aluminum can be mechanically mixed with a powdered mixture of silicon and copper or a sintered mixture of these materials, or the aluminum or zinc may be alloyed with the silicon and the crushed alloy mixed with the metal catalyst. The principal advantage gained by the introduction of aluminum or zinc into the silicon contact mass is an increase in the relative yield of the trialkylhalogenosilane.

In order that those skilled in the art better may understand how the present invention can be carried into effect, the following illustrative examples are given:

Example 1

About 600 grams of a sintered mixture of 10% copper and 90% silicon of the type disclosed in the above-mentioned Rochow and Patnode application was mixed with 30 grams of 200 mesh aluminum powder and the mixture charged into a vertical glass reaction tube about 3 inches in diameter. The charge was heated to a temperature between 300–350° C. and methyl chloride was passed through the heated mixture. A reaction ensued with the formation of aluminum chloride which sublimed and was collected in a special trap fitted to the reaction tube, and a liquid product which was condensed by means of a water-cooled condenser. A distillation analysis of this product showed that it contained 10% of trimethylchlorosilane. This is to be compared with the usual 3 to 5% yield when methyl chloride is passed over the same sintered mixture of silicon and copper in the absence of aluminum.

Example 2

The same apparatus as that used in Example 1 was charged with a mixture of 600 grams of a 10% copper-90% silicon sintered powder and 120 grams of zinc. The charge was heated to 330–450° C. and a stream of methyl chloride was passed through the tube. The liquid product condensed in the water-cooled condenser was found to contain about 20% of trimethylchlorosilane.

*Example 3*

An alloy was prepared from 392 grams of 99.8% purified silicon and 8 grams of aluminum. The alloy was pulverized and 315 grams of the pulverized alloy was mixed with 35 grams of 200 mesh copper powder and the mixture sintered at 1050° C. The sintered mixture was charged into a vertical glass reaction tube, heated to a temperature between 300–350° C., and a stream of methyl chloride gas passed through the heated charge. A condensate collected by means of a water-cooled condenser was found to contain more than three times as much trimethylchlorosilane as was obtained from a sintered mixture of the same silicon and copper under the same conditions but in the absence of aluminum.

*Example 4*

A vertical glass reaction tube was charged with a mixture of 600 grams of a sintered mixture of 10% copper and 90% silicon and 60 grams of coarse aluminum powder larger than 100 mesh. A stream of methyl chloride was passed through the charge held at a temperature between 300–350° C. The mixture of chlorosilanes condensed by means of a water-cooled condenser contained about 20% trimethylchlorosilane along with substantial yields of dimethyldichlorosilane and methyltrichlorosilane.

It will be understood, of course, that my invention is not limited to the specific hydrocarbon halide named in the above illustrative examples, and that other lower alkyl halides (ethyl chloride, methyl bromide, etc.) may be reacted with silicon at an elevated temperature and in the presence of aluminum or zinc to produce mixtures of lower alhkyhalogenosilanes containing substantial quantities of trialkyl derivatives.

Likewise the invention is not limited to the specific temperatures or temperature ranges mentioned in the examples. However, the reaction temperature should not be so high as to cause an excessive deposition of carbon upon the unreacted silicon during the reaction. In general, the reaction temperature to be used will vary with, for example, the particular hydrocarbon halide employed, the particular catalyst (if any) used and the yields of the specific reaction products desired to be obtained from a particular starting hydrocarbon halide. At temperatures of the order of 200° C. the reaction proceeds much more slowly than at reaction temperatures around 250° to 400° C. At temperatures much above 400° C., in the case of methyl chloride for example, there is a vigorous exothermic reaction which generally results in an undesirable deposition of carbon in the reaction tube. Although methyl silicon chlorides in varying yields can be produced by effecting reaction between methyl chloride and silicon at various temperatures within the temperature range of 200° to 500° C., optimum results usually are obtained within the more limited range of 250° to 400° C.

It also will be understood by those skilled in the art that metallic catalysts other than copper may be employed to accelerate or to control the course of the reaction between the hydrocarbon halide and the silicon. Examples of such catalysts, in addition to copper, are nickel, tin, antimony, manganese, silver and titanium. In general, copper is the preferred catalyst for the silicon-alkyl halide reaction.

Mixtures of lower alkyl halogenosilanes of increased alkylation can also be obtained by passing the mixed reaction products of an alkyl halide and silicon or the pure mono- or di-alkylhalogenosilane over heated aluminum or zinc. This method of obtaining alkylhalogenosilanes of high alkyl-to-silicon ratio is specifically described and claimed in my copending application Serial No. 582,999, filed concurrently herewith and assigned to the same assignee as the present invention.

What I claim as new and desire to secure by Letters Patent of the United States is:

1. The method of preparing mixtures of alkylhalogenosilanes containing substantial quantities of a trialkylhalogenosilane which comprises effecting reaction between heated silicon and a lower alkyl halide in the presence of a metal selected from the group consisting of aluminum and zinc.

2. The method of increasing the proportions of more highly alkylated halogenosilanes obtained by effecting reaction between a lower alkyl halide and heated silicon which comprises carrying out said reaction in the presence of a metal selected from the group consisting of aluminum and zinc.

3. The method of preparing mixtures of alkylhalogenosilanes containing substantial quantities of both the di- and tri-alkyl derivatives which comprises effecting reaction between heated silicon and a lower alkyl halide in the presence of a metal selected from the group consisting of aluminum and zinc.

4. The method of increasing the proportions of more highly alkylated halogenosilanes obtained by effecting reaction between a lower alkyl halide and heated silicon which comprises carrying out said reaction in the presence of copper as a catalyst for the silicon-alkyl halide reaction and a second metal selected from the group consisting of aluminum and zinc.

5. The method of preparing mixtures of alkylhalogenosilanes containing substantial quantities of both the di- and tri-alkyl derivatives which comprises effecting reaction between heated silicon and a lower alkyl halide in the presence of copper and a metal selected from the group consisting of aluminum and zinc.

6. The method of preparing mixtures of methylhalogenosilanes containing substantial quantities of trimethylhalogenosilane which comprises effecting reaction between heated silicon and a methyl halide in the presence of copper and a metal selected from the group consisting of aluminum and zinc.

7. The method of increasing the proportions of trimethylchlorosilane obtained by effecting reaction between methyl chloride and heated silicon which comprises carrying out said reaction in the presence of copper and aluminum.

8. The method of preparing mixtures of methylchlorosilanes containing substantial quantities of both the di- and tri-methyl derivatives which comprises effecting reaction between heated silicon and methyl chloride in the presence of copper and zinc.

9. The method of preparing a mixture of alkylhalogenosilanes containing substantial quantities of a trialkylhalogenosilane which comprises effecting reaction between heated silicon and a lower alkyl halide in the presence of a metal selected from the group consisting of aluminum and zinc, the said metal being present, by weight, in an amount equal to from about 2 to 25 per cent based on the weight of the silicon.

10. The method of preparing mixtures of methylhalogenosilanes containing substantial quantities of trimethylhalogenosilane which comprises effecting reaction between heated silicon and a methyl halide in the presence of copper and a metal selected from the group consisting of aluminum and zinc, the said metal being present, by weight, in an amount equal to from about 2 to 25 per cent based on the weight of the silicon.

DALLAS T. HURD.

REFERENCES CITED

The following references are of record in the file of this patent:

UNITED STATES PATENTS

| Number | Name | Date |
| --- | --- | --- |
| 2,380,995 | Rochow | Aug. 7, 1945 |